United States Patent
Krishna et al.

(10) Patent No.: US 6,779,732 B2
(45) Date of Patent: Aug. 24, 2004

(54) METHOD AND APPARATUS FOR LINKING CONVERTED APPLET FILES

(75) Inventors: Ksheerabdhi Krishna, Cedar Park, TX (US); Tim Wilkinson, San Francisco, CA (US); Yannick Burianne, Clamart (FR)

(73) Assignee: Schulumberger Malco, Inc., Owings Mills, MD (US)

( * ) Notice: Subject to any disclaimer, the term of this patent is extended or adjusted under 35 U.S.C. 154(b) by 399 days.

(21) Appl. No.: 09/945,107

(22) Filed: Aug. 31, 2001

(65) Prior Publication Data

US 2003/0042318 A1 Mar. 6, 2003

(51) Int. Cl.[7] ............................................... G06K 5/00
(52) U.S. Cl. .................................... 235/492; 705/65
(58) Field of Search ............................ 235/380, 492; 705/65

(56) References Cited

U.S. PATENT DOCUMENTS

| | | | |
|---|---|---|---|
| 5,734,822 A | | 3/1998 | Houha et al. |
| 5,999,732 A | * | 12/1999 | Bak et al. .................. 717/148 |
| 6,338,160 B1 | * | 1/2002 | Patel et al. ................. 717/139 |

FOREIGN PATENT DOCUMENTS

| | | |
|---|---|---|
| EP | 0 964 370 A | 12/1999 |
| EP | 0964370 A1 | 12/1999 |
| WO | WO 99/49392 A1 | 9/1999 |
| WO | WO 00/46667 A2 | 8/2000 |

OTHER PUBLICATIONS

"Sun Rises over Smart Cards" 1998 Advanced Card Technology Sourcebook, Faulkner & Gray, 1997, pp. 150–154.*
Fodor, O. et al. "JavaCard and OpenCard Framework :a tutorial" Emerging Technologies and Factory Automation, 1999. Proceedings. ETFA '99.1999 17th IEEE International Conference, Barcelona, Spain Oct. 18–21 1999, Piscataway, NJ, USA, IEEE, US, Oct. 18, 1999.
International Search Report in PCT/US02/25650 dated Feb. 3, 2003 (5 pages).

* cited by examiner

*Primary Examiner*—Mark Tremblay
(74) *Attorney, Agent, or Firm*—Pehr B. Jansson; William Batzer; John J. Ryberg

(57) ABSTRACT

A smart card which includes a non-volatile read/write memory, a resolve buffer, a processor connected to the memory and the resolve buffer, and an installer module configured to cause the processor to receive computer code having unresolved references into the memory, and further configured to cause the processor to perform a method for resolving unresolved references. The method including steps for copying the contents of the memory into the resolve buffer, detecting unresolved references in the computer code, determining the resolved reference for each of the detected unresolved references, updating the contents of the resolve buffer with the resolved references, and replacing the contents of the memory with the contents of the resolve buffer.

38 Claims, 4 Drawing Sheets

METHOD AND APPARATUS FOR LINKING CONVERTED APPLET FILES

BACKGROUND

1. Field of the Present Invention

The present invention generally relates to the field of smart cards and more particularly to an improved smart card and method for resolving unresolved references within converted applet files loaded into a smart card.

2. History of Related Art

Most consumers are familiar with and use credit cards, debit cards, automatic teller machine (ATM) cards, stored value cards, and the like. For many types of transactions, however, the current trend is away from these types of cards and into a class of devices generally referred to as smart cards. A smart card is a plastic, credit-card sized card that includes an electronic device (chip) embedded in the card's bulk plastic. Rather than only employing a magnetic strip to store information, smart cards employ a microprocessor and a memory element embedded within the chip.

Because they have a chip, smart cards can be programmed to operate in a number of varied capacities such as stored value cards, credit cards, debit cards, ATM cards, calling cards, personal identity cards, critical record storage devices, etc. In these varied capacities, a smart card may be designed to use a number of different application programs. Smart cards are compliant with Standard 7816 Parts 1–10 of the International Organization for Standardization (ISO), which are incorporated by reference herein and referred to generally as "ISO 7816." Smart cards are resource-constrained devices, and as such, have minimal memory configurations typically on the order of 1K or 2K of random access (volatile) memory (RAM), 16K or 32K of non-volatile read/write memory such as an electrically erasable programmable read only memory (EEPROM), and 24K of read only memory (ROM). The term "EEPROM" is used throughout to broadly refer to non-volatile (i.e., persistent) memory, including flash memory. Initially, application program development for smart cards was essentially proprietary. That is, each smart card's software was specific to the design of its embedded microprocessor; with the end result being an extremely limited ability for the development of applications that could run on cards produced by different manufacturers. As a result, smart card application development was limited to a relatively small group of developers who either worked for the smart card manufacturers or the smart card issuers.

In recent years, however, smart card application development has evolved so that it is no longer proprietary. Through the adoption of open architectures for application development, it is now possible to develop applications that can run on smart cards from different manufacturers as well as other resource constrained devices that, like smart cards, have small amounts of available memory or other devices for the storage of data (i.e., storage devices). Java Card technology is an example of one such open development architecture. It uses the Java™ programming language and employs the Java Card runtime environment (JCRE). The JCRE conforms to ISO 7816 and defines a platform on which applications written in the Java programming language can run on smart cards and other resource-constrained devices. Applications written for the JCRE are referred to AS applets.

Before an applet can be loaded onto a smart card for execution, however, the source code of the applet must be converted into a corresponding binary representation of the classes making up the applet. This corresponding binary representation is referred to as a CAP file (converted applet file) and is the file format in which applications are loaded onto smart cards utilizing the JCRE. The CAP file is typically loaded as a block of bytes occupying contiguous space in the non-volatile read/write memory of the smart card by an installer module located on the smart card.

Each CAP file may contain calls to various symbolic or unresolved code references which must be resolved prior to execution. The terms "call" or "calling" are used throughout to broadly describe a relationship between two pieces of code in which one piece invokes the other. Commands, functions, definitions, etc. may typically be invoked by having code within the application call another piece of code, with the latter piece of code residing within the application itself or in a library of functions present on the smart card. The process of resolving these calls to unresolved code references is generally referred to as linking or resolution and involves looking-up the symbolic reference in a corresponding table present in memory (constant pool) or other storage device or calculating the unresolved relative code reference and replacing the reference with the actual memory address or an internally accessible symbolic reference at which the particular command, function, definition, etc. is stored. While the linking or resolution process typically applies to unresolved references in computer code, the process may be applied to any construct used for storing or manipulating data (i.e., data structures) with unresolved references contained therein. The terms "resolve," "resolution," and "resolving" are used throughout to broadly describe the foregoing process of replacing the unresolved code or symbolic reference within the code or data structure with an internally accessible symbolic reference or actual memory address.

Linking is traditionally accomplished on-card by the card's installer module utilizing non-volatile read/write memory. As noted above, the non-volatile read/write memory of a smart card typically consists of EEPROM. Characteristics of EEPROM technology result in an access and write to EEPROM requiring a significantly greater time than a corresponding access and write to RAM. Further, EEPROM's have a limitation on the number of times they may be written (typically on the order of tens or hundreds of thousands of times). Consequently, performing the required linking process for the CAP file in EEPROM is time consuming and impacts the operational life of the EEPROM. Accordingly, it would be beneficial to implement an apparatus and method for the efficient linking of CAP files that minimizes the number of writes to the EEPROM.

BRIEF DESCRIPTION OF THE DRAWINGS

The structure and operation of the invention will become apparent upon reading the following detailed description and upon reference to the accompanying drawings in which.

Figure 1:
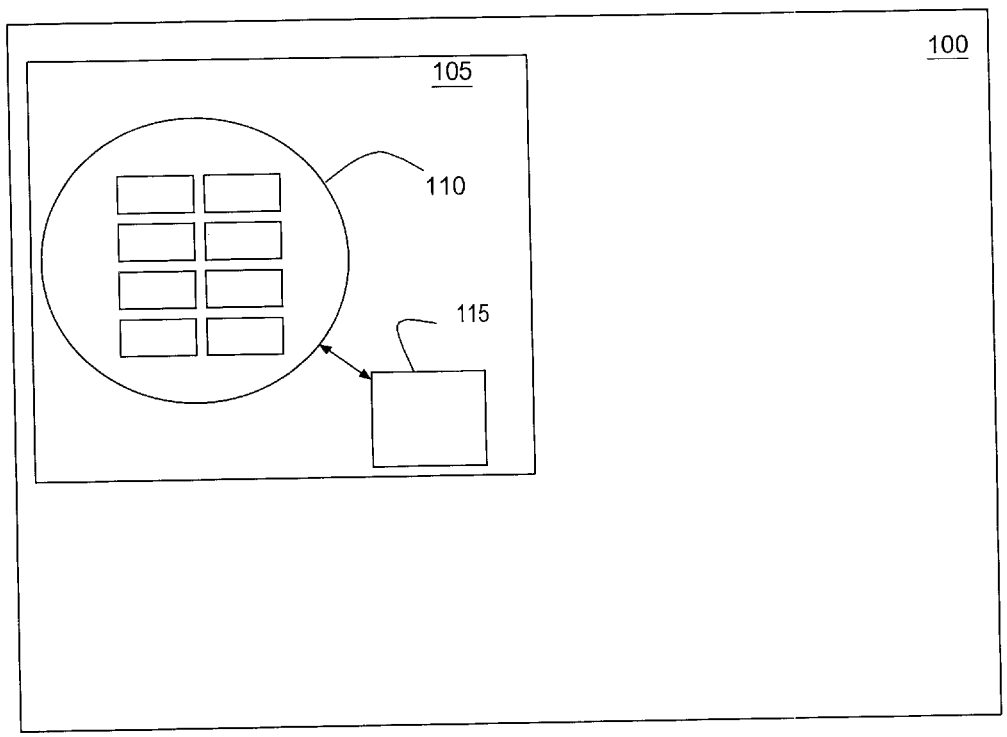
FIG. 1 shows an exemplary smart card.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed. On the contrary, the invention is limited only by the claim language.

DETAILED DESCRIPTION OF THE INVENTION

Generally speaking the present invention contemplates a smart card and method in which the smart card may be configured to receive computer code such as converted applet files with unresolved references within such files and resolve such unresolved references so as to minimizes the number of writes to the EEPROM.

Throughout the description and the drawings, elements which are the same will be accorded the same reference numerals.

FIG. 1 shows an exemplary smart card. Smart card 100 is roughly the size of a credit card and includes a module 105 with conductive contacts 110 connected to a microprocessor with an integral memory element 115. Conductive contacts 110 interface with a terminal to typically provide operating power and to electrically transfer data between the terminal and the smart card. Other embodiments of a smart card may not include conductive contacts 110. Such "contactless" smart cards may exchange information and may receive power via proximately coupling, such as magnetic coupling, or via remote coupling, such as radio communication. Smart card 100 is compliant with ISO 7816.

Figure 2:
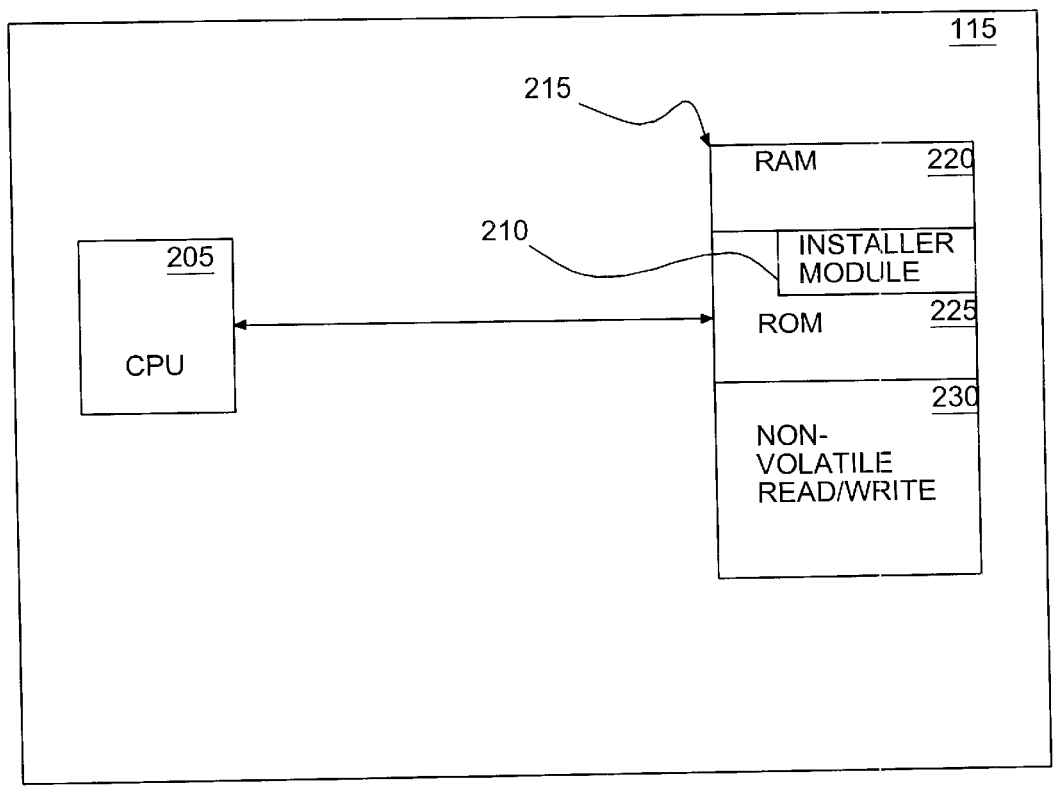
FIG. 2 conceptually illustrates the microprocessor with integral memory element 115 portion of module 105 of the exemplary smart card of FIG. 1 in some additional detail.

The microprocessor with an integral memory element 115 of FIG. 1 is shown in additional detail in FIG. 2. Microprocessor 115 includes central processing unit (CPU) 205. Microprocessor 115 is associated with a memory element 215. The "memory" may be formed on the same integrated circuit as microprocessor 115 or may be formed on a separate device.

Generally, the memory element 215 is configured to include RAM 220, ROM 225, and non-volatile read/write memory 230. Read only memory 225 is configured to include installer module 210.

In an alternative configuration, RAM 220, ROM 225, and non-volatile read/write memory 230 are not located in the same memory element 215, but rather, in some combination of separate electronic units.

Figure 3:
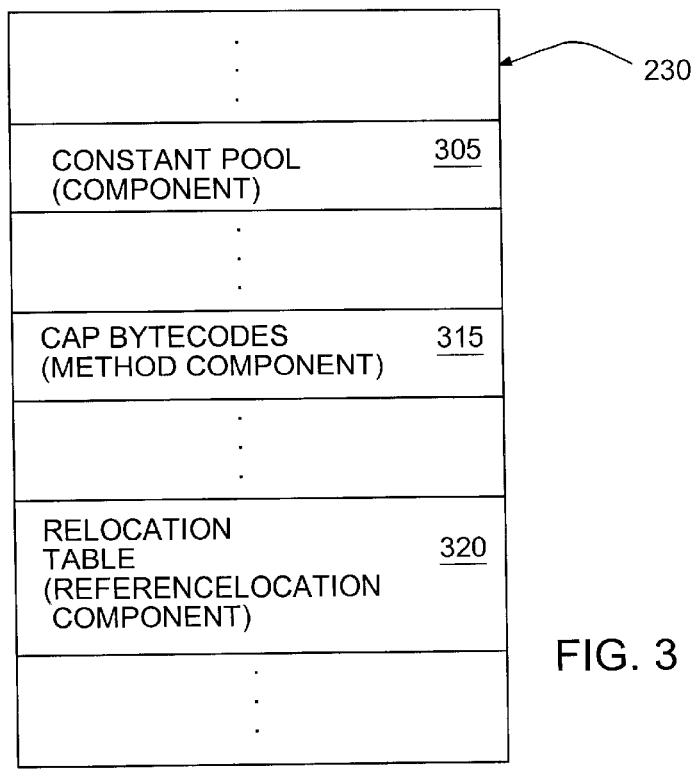
FIG. 3 conceptually illustrates a portion of non-volatile read/write memory 230 loaded with a CAP file.

FIG. 3 conceptually illustrates a portion of non-volatile read/write memory 230 loaded with CAP file components. Constant pool component 305 contains memory addresses for symbolic references used in the linking process. CAP bytecodes method component (i.e., instructions) 315 and relevant relocation table 320 are also depicted. Constant pool component 305, CAP bytecodes method component 315 together with applicable relocation table 320 may be loaded into non-volatile read/write memory 230 by installer module 210.

Figure 4:
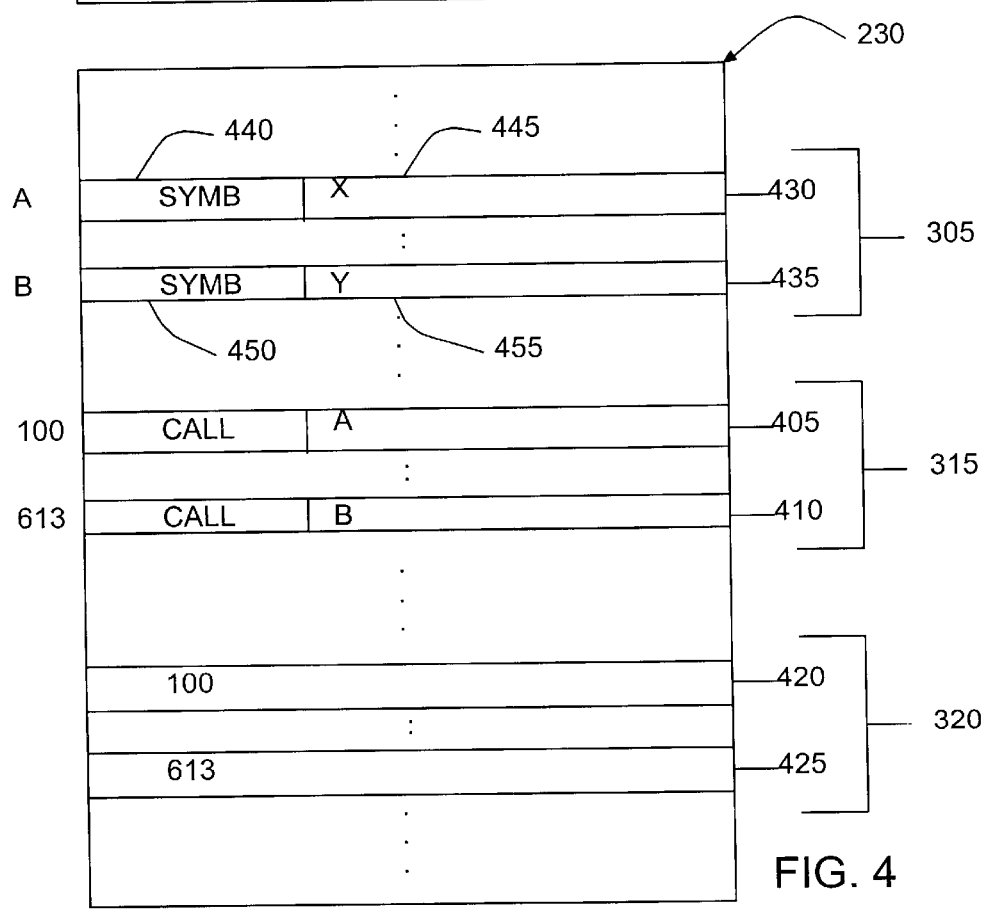
FIG. 4 is an example of the constant pool, instruction set, and relocation table components for the CAP file depicted in FIG. 3.

FIG. 4 is an example of sample information, code, and data contained in constant pool 305, CAP bytecodes component 315, and applicable relocation table 320 depicted in FIG. 3. In FIG. 4, non-volatile read/write memory 230 is depicted in which CAP bytecodes method component 315 includes a first instruction code 405 and a subsequent instruction code 410 which are stored starting at memory address 100. Instruction codes 405 and 410 are both call codes followed by a parameter which in the current instance is a symbolic reference.

Relocation table 320 includes relocation information of which two relocation entries 420 and 425, respectively, are depicted. First relocation entry 420 includes information which points to memory address 100. Subsequent relocation entry 425 includes information which points to memory address 613. Constant pool component 305 includes actual memory address information for symbolic references A and B, respectively, in the form of entries 430 and 435, respectively. First constant pool component entry 430 further includes relocation type identifier 440 and corresponding application identifier 445. Subsequent constant pool component entry 435 further includes relocation type identifier 450 and corresponding application identifier 455.

The prior art employs a linking process generally involving the steps of parsing relocation table 320 by starting with first relocation entry 420, discerning the relevant memory address, accessing the relevant memory address (in this example, 100), determining that the applicable instruction at memory address 100 contains a call to symbolic reference A, discerning the relevant relocation identifier 440 for symbolic reference A, accessing the relevant memory address information 445 in constant pool 305, and updating the parameter of first instruction code 405 with the memory address for the relevant symbolic reference 430 by writing such memory address to first instruction code 405. The same steps are performed using each subsequent relocation entry, including relocation entry 425. In this manner, each entry in the relocation table for a CAP file is processed, the relevant unresolved reference is resolved, and the EEPROM is updated with the resolved memory address. It should be appreciated that the relocation type identifier may indicate the resolution of an absolute address in which event the relevant memory address is calculated rather than being accessed in constant pool 305.

Figure 5:
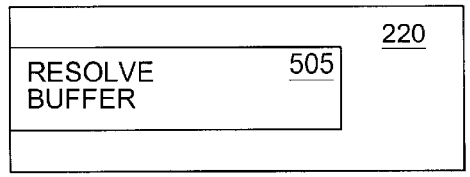
FIG. 5 depicts a resolve buffer suitable for use in a smart card according to an embodiment of the invention.

FIG. 5 depicts a resolve buffer 505 configured in random access memory 220 and suitable for use in a smart card according to an embodiment of the invention. Resolve buffer 505 provides the function of acting as a scratch-pad into which data may be temporarily stored and updated and is used for updating unresolved references. In an embodiment of the invention, the size of resolve buffer 505 may be optimally configured to equal the size of one page of non-volatile read/write memory 230, and thus, facilitate an efficient linking process by grouping the relevant number of updates of the unresolved references in the resolve buffer 505 so as to reduce the overall number of slow, time-consuming updates to non-volatile read/write memory 230. Alternatively, the size of the resolve buffer 505 may equal an integer multiple of the size of one page of non-volatile read/write memory 230. The resolve buffer 505 may be accessed by the installer module 210 to store the contents of a portion of a CAP file for the purpose of manipulating the contents of that portion of the CAP file.

Figure 6:
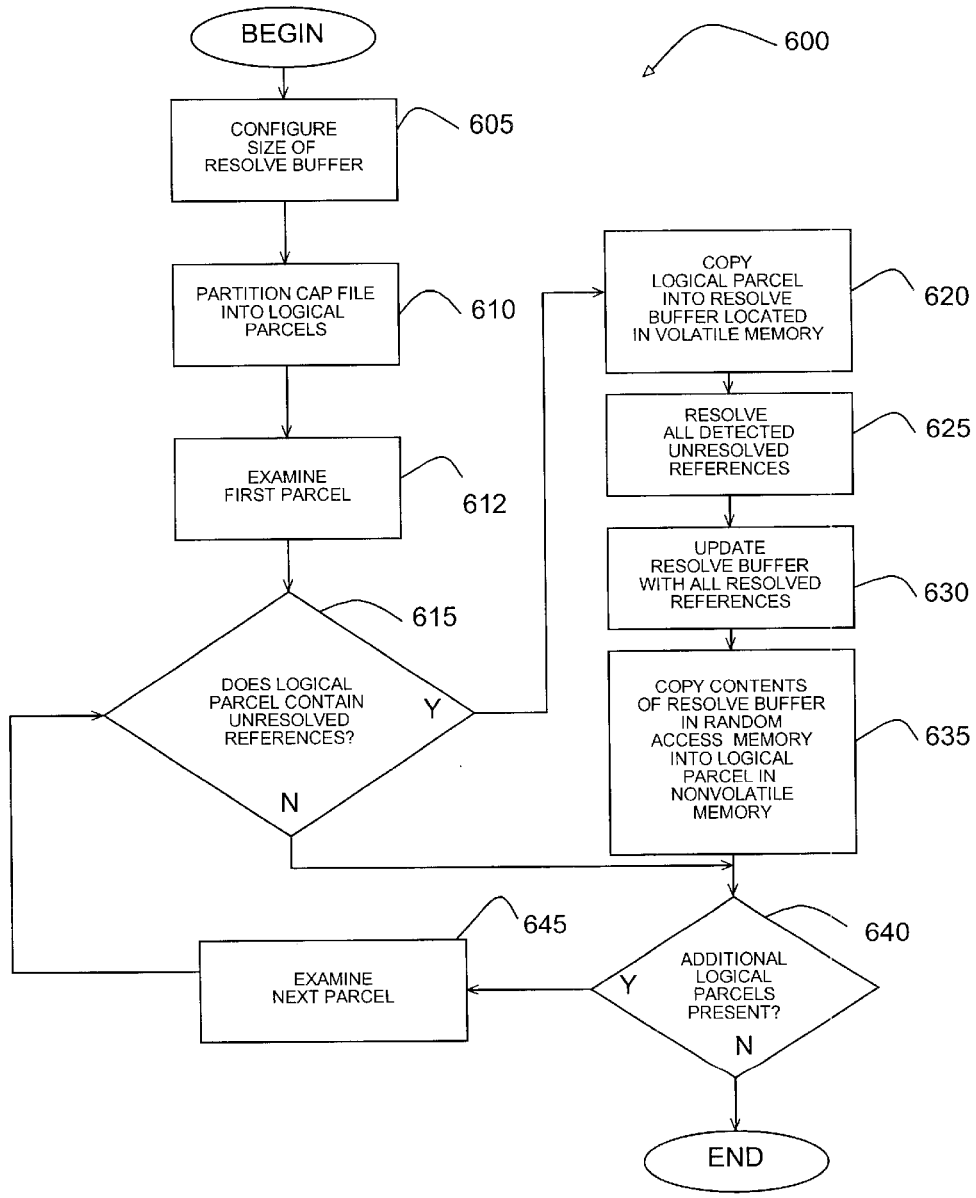
FIG. 6 is a flowchart further illustrating one aspect of the present invention.

FIG. 6 depicts a flow diagram illustrating a method 600 of the present invention. In the depicted embodiment, preliminarily, the size of the resolve buffer 505 is configured (block 605). In one embodiment of the invention, block 605 includes a sub-method of configuring the resolve buffer size to equal an integer multiple of the page size of non-volatile read/write memory 230. In another embodiment of the invention, block 605 includes optimally configuring the resolve buffer 505 to equal the size of one page of non-volatile read/write memory 230 so as to facilitate an efficient linking process by grouping the relevant number of updates of the unresolved references in the resolve buffer 505 so as to reduce the overall number of slow, time-consuming updates to non-volatile read/write memory 230. The CAP file is partitioned into logical parcels or blocks (block 610) wherein each parcel may be equal to the size of the configured resolve buffer. Each logical parcel functions to be a partition of data that may be transferred in one operation between non-volatile read/write memory 230 and random access memory 220. The first logical parcel is examined (block 612) to determine if unresolved references are present (block 615). If unresolved references are not present, a determination is made as to whether additional logical parcels are present (block 640) and if so, the next logical parcel is examined (block 645) and a determination is made as to whether unresolved references are present (block 615). If additional logical parcels are not present (block 640), the process is complete.

For each logical parcel in which unresolved references are present, the contents of the logical parcel are copied into the resolve buffer (block 620), the unresolved references are resolved (block 625), the contents of the resolve buffer are updated with the resolved references (block 630), the contents of the logical parcel in non-volatile read/write memory 230 are replaced with the contents of the updated resolve buffer in random access memory (block 635), and the steps of blocks 615, 620, 625, 630, and 635 are once again conducted for the remaining logical parcels (block 640). It should be appreciated that in those instances where a logical parcel contains interdependent unresolved references, the steps of blocks 630 and 635 must be performed immediately following the resolution of each unresolved reference upon which other unresolved references within the logical parcel depend.

Alternatively, the CAP file is examined for unresolved references and these unresolved references are resolved in successive parcels. In this alternative, a pointer is positioned at a location in the CAP file, for example, at the beginning of the CAP bytecodes component 315. The data stored between the pointer and a second address are examined for unresolved references. As discussed above, if there are any unresolved references, the data between the pointer and the second address are copied into the resolve buffer 505. The unresolved references are resolved and the resolve buffer 505 is updated. After the unresolved references have been resolved and resolve buffer 505 updated, the contents of the resolve buffer 505 are copied back into the CAP file beginning at the pointer. The pointer is then advanced to another location in the CAP file. In one embodiment, the pointer is advanced to the location immediately following the second address.

In one alternative embodiment, the presence of unresolved references is detected in the non-volatile read/write memory 230 and only if unresolved references are detected, is the logical parcel copied to the resolve buffer 505. In another alternative embodiment, each logical parcel is first copied into the resolve buffer 505 and the detection of unresolved references is performed in the resolve buffer 505. In the latter case, it would not be necessary to copy the contents back to the non-volatile read/write memory 230 unless unresolved references were detected.

In an alternative embodiment, the various logical parcels are not examined and resolved in sequential order.

Further, it should be appreciated that portions of the present invention may be implemented as a set of computer executable instructions (software) stored on or contained in a computer-readable medium. The computer readable medium may include a non-volatile medium such as a floppy diskette, hard disk, flash memory card, ROM, CD ROM, DVD, magnetic tape, or another suitable medium.

As introduced above, the term "smart card" was described with reference to the device shown in FIG. 1. While this example serves well for the explanations which followed, it should be noted that the present invention is broadly applicable to a class of resource-constrained devices having physical form factors which are different from the one illustrated in the example. For example, the present invention is readily adapted to Secure Interface Modules (SIMs) and Secure Access Modules (SAMs). SIMs and SAMs are physically smaller versions of the typical smart card and are typically used within telephones or other small spaces. The size, shape, nature, and composition of the material encapsulating or mounting the microprocessor and memory element are not relevant or limiting to the present invention. Thus, as used throughout, the term "smart card" is to be broadly read as encompassing any self-contained combination of microprocessor and memory element capable of performing a transaction with another device referred to as a terminal.

It will be apparent to those skilled in the art having the benefit of this disclosure that the present invention contemplates a smart card and method for the efficient linking of computer code that minimizes the number of writes to the EEPROM with the invention beneficially reducing the time required for linking the computer code and beneficially increasing the operational life of the EEPROM. It is understood that the forms of the invention shown and described in the detailed description and the drawings are to be taken merely as presently preferred examples and that the invention is limited only by the language of the claims.

What is claimed is:

1. A method for resolving unresolved references within computer code loaded into a memory of a smart card comprising:

a) copying a portion of the contents of the memory into a resolve buffer;

b) detecting at least one unresolved reference in the computer code in the portion of the contents of the memory;

c) determining the resolved reference for the detected unresolved reference;

d) updating the contents of the resolve buffer with the resolved reference; and e) replacing the portion of the contents of the memory with the contents of the resolve buffer.

2. The method for resolving unresolved references within computer code of claim 1 wherein the resolve buffer comprises random access memory.

3. The method for resolving unresolved references within computer code of claim 1 wherein the memory comprises non-volatile read/write memory.

4. The method for resolving unresolved references within computer code of claim 3 wherein the computer code comprises a converted applet file.

5. The method for resolving unresolved references within computer code of claim 1 further comprising:

f) configuring the size of the resolve buffer to be an integer multiple of the size of a page of the memory.

6. The method for resolving unresolved references within computer code of claim 5 wherein the size of the resolve buffer is equal to the size of a page of memory.

7. The method for resolving unresolved references within computer code of claim 1 further comprising:

g) partitioning the computer code into a plurality of logical parcels wherein the size of each parcel is equivalent to the resolve buffer size.

8. The method of claim 7 wherein each of the steps a), b), c), d), and e) are collectively performed on each of the parcels before continuing to the next parcel commencing with a first parcel and proceeding with subsequent parcels.

9. The method of claim 8 wherein the proceeding with subsequent parcels is performed in a sequential manner.

10. A method for resolving unresolved references within computer code loaded into a memory of a smart card comprising:

a) detecting at least one unresolved reference in the computer code in a portion of the contents of the memory;

b) copying the portion of the contents of the memory into a resolve buffer in response to the detecting at least one unresolved reference in the computer code of the portion of the contents of the memory;

c) determining the resolved reference for the detected unresolved reference;

d) updating the contents of the resolve buffer with the resolved reference; and e) replacing the portion of the contents of the memory with the updated contents of the resolve buffer.

11. The method for resolving unresolved references within computer code of claim 10 wherein the resolve buffer comprises random access memory.

12. The method for resolving unresolved references within computer code of claim 10 wherein the memory comprises non-volatile read/write memory.

13. The method for resolving unresolved references within computer code of claim 12 wherein the computer code comprises a converted applet file.

14. The method for resolving unresolved references within computer code of claim 10 further comprising:

f) configuring the size of the resolve buffer to be an integer multiple of the size of a page of the memory.

15. The method for resolving unresolved references within computer code of claim 14 wherein the size of the resolve buffer is equal to the size of a page of memory.

16. The method for resolving unresolved references within computer code of claim 10 further comprising:

g) partitioning the computer code into a plurality of logical parcels wherein the size of each parcel is equivalent to the resolve buffer size.

17. The method of claim 16 wherein each of the steps a), b), c), d), and e) are collectively performed on each of the parcels before continuing to the next parcel commencing with a first parcel and proceeding with subsequent parcels.

18. The method of claim 17 wherein the proceeding with subsequent parcels is performed in a sequential manner.

19. A computer-readable medium tangibly having a program of machine-readable instructions for causing a processor to perform a method for resolving unresolved references within computer code loaded into a memory of a smart card, the method comprising:

a) copying a portion of the contents of the memory into a resolve buffer;

b) detecting at least one unresolved reference in the computer code in the portion of the contents of the memory;

c) determining the resolved reference for the detected unresolved reference;

d) updating the contents of the resolve buffer with the resolved reference; and e) replacing the contents of the portion of the memory with the contents of the resolve buffer.

20. The computer-readable medium of claim 19 further having instructions for causing a processor to perform a method comprising:

f) configuring the size of the resolve buffer to be an integer multiple of the size of a page of the memory.

21. The computer-readable medium of claim 19 further having instructions for causing a processor to perform a method comprising:

g) partitioning the computer code into a plurality of logical parcels wherein the size of each parcel is equivalent to the resolve buffer size.

22. The computer-readable medium of claim 21 further having instructions for causing a processor to perform each of the steps a), b), c), d), and e) collectively on each of the parcels before continuing to the next parcel commencing with a first parcel and proceeding with subsequent parcels.

23. The computer-readable medium of claim 22 further having instructions for causing the processor to perform the proceeding with subsequent parcels in a sequential manner.

24. A smart card configured to receive computer code having unresolved references within the computer code comprising:

a memory;

a resolve buffer;

a processor connected to the memory and the resolve buffer; and an installer module having logic operable to cause the processor to receive the computer code into the memory; and further having logic operable to cause the processor to resolve unresolved references within the computer code by a) copying a portion of the contents of the memory into the resolve buffer; b) detecting at least one unresolved reference in the computer code in the portion of the contents of the memory; c) determining the resolved reference for the detected unresolved reference; d) updating the contents of the resolve buffer with the resolved reference; and e) replacing the portion of the contents of the memory with the contents of the resolve buffer.

25. The smart card of claim 24 wherein the resolve buffer comprises random access memory.

26. The smart card of claim 24 further having logic operable to cause the processor to resolve unresolved references within the computer code by f) configuring the size of the resolve buffer to be an integer multiple of the size of a page of the memory.

27. The smart card of claim 24 wherein the memory comprises non-volatile read/write memory.

28. The smart card of claim 24 wherein the computer code comprises a converted applet file.

29. The smart card of claim 24 further having logic operable to cause the processor to resolve unresolved references within the computer code by g) partitioning the computer code into a plurality of logical parcels wherein the size of each parcel is equivalent to the resolve buffer size.

30. The smart card of claim 29 wherein each of the steps a), b), c), d), and e) are collectively performed on each of the parcels before continuing to the next parcel commencing with a first parcel and proceeding with subsequent parcels.

31. The smart card of claim 30 wherein the proceeding with subsequent parcels is performed in a sequential manner.

32. A method of resolving unresolved references in a data structure, comprising:
  a) partitioning the data structure having unresolved references and located on a first storage device into a plurality of blocks;
  b) copying a block of data at a first location in the data structure into a resolve buffer;
  c) resolving at least one unresolved reference in the block of data in the resolve buffer; and
  d) copying the contents of the resolve buffer back to the first storage device at the first location.

33. The method of resolving unresolved references of claim 32, wherein the data structure comprises a converted applet file.

34. The method of resolving unresolved references of claim 32, wherein partitioning the data structure having unresolved references and located on a first storage device into a plurality of blocks comprises partitioning the data structure into logical parcels.

35. The method of resolving unresolved references of claim 32, wherein the resolve buffer comprises random access memory.

36. The method of resolving unresolved references of claim 32, wherein the first storage device comprises non-volatile read/write memory.

37. The method of resolving unresolved references of claim 32, wherein the resolve buffer comprises random access memory.

38. The method of resolving unresolved references of claim 32 wherein copying a block of data at a first location in the data structure into a resolve buffer is responsive to detecting at least one unresolved reference in the block of data.

* * * * *